United States Patent [19]

Gastgeb

[11] Patent Number: 4,841,256
[45] Date of Patent: Jun. 20, 1989

[54] PIEZOELECTRIC PHASE LOCKED LOOP CIRCUIT

[75] Inventor: Raymond F. Gastgeb, Doylestown, Pa.

[73] Assignee: Pennwalt Corporation, Philadelphia, Pa.

[21] Appl. No.: 110,260

[22] Filed: Oct. 20, 1987

[51] Int. Cl.$^4$ .................... G01F 23/22; G01L 1/16; H03L 7/08

[52] U.S. Cl. ................... 331/25; 73/290 V; 73/778; 73/DIG. 4; 331/65; 331/158; 331/DIG. 2; 310/338; 340/621

[58] Field of Search ............... 331/25, 65, 155, 158, 331/DIG. 2; 73/290 V, 778, 861.18, DIG. 1, DIG. 4; 310/314, 318, 319, 338; 318/116; 340/621

[56] References Cited

U.S. PATENT DOCUMENTS

| | | | |
|---|---|---|---|
| 4,056,761 | 11/1977 | Jacoby et al. | 331/25 X |
| 4,395,651 | 7/1983 | Yamamoto | 310/317 |
| 4,450,375 | 5/1984 | Siegal | 310/331 |
| 4,473,859 | 9/1984 | Stone et al. | 361/93 |
| 4,499,394 | 2/1985 | Koal | 310/330 |
| 4,538,139 | 8/1985 | Clemente | 340/539 |
| 4,595,855 | 6/1986 | Farrall | 310/332 |

Primary Examiner—Siegfried H. Grimm
Attorney, Agent, or Firm—Seidel, Gonda, Lavorgna & Monaco

[57] ABSTRACT

A structural member having a piezoelectric transmitter film and a piezoelectric receiver film adhered thereto. The transmitter film produces a vibration upon activation by a voltage controlled oscillator which forms part of a phase-lock loop circuit. The vibrations of the structural member generate electric signals on the receiver film, which feed into a phase comparator. The other input of the phase comparator is the output signal of the voltage controlled oscillator. The phase comparator will output a dc signal proportional to the difference in phase between the two signals. When the structural member becomes damped, the phase comparator will go into saturation, thereby producing a voltage which can activate an alarm signal or other device.

8 Claims, 4 Drawing Sheets

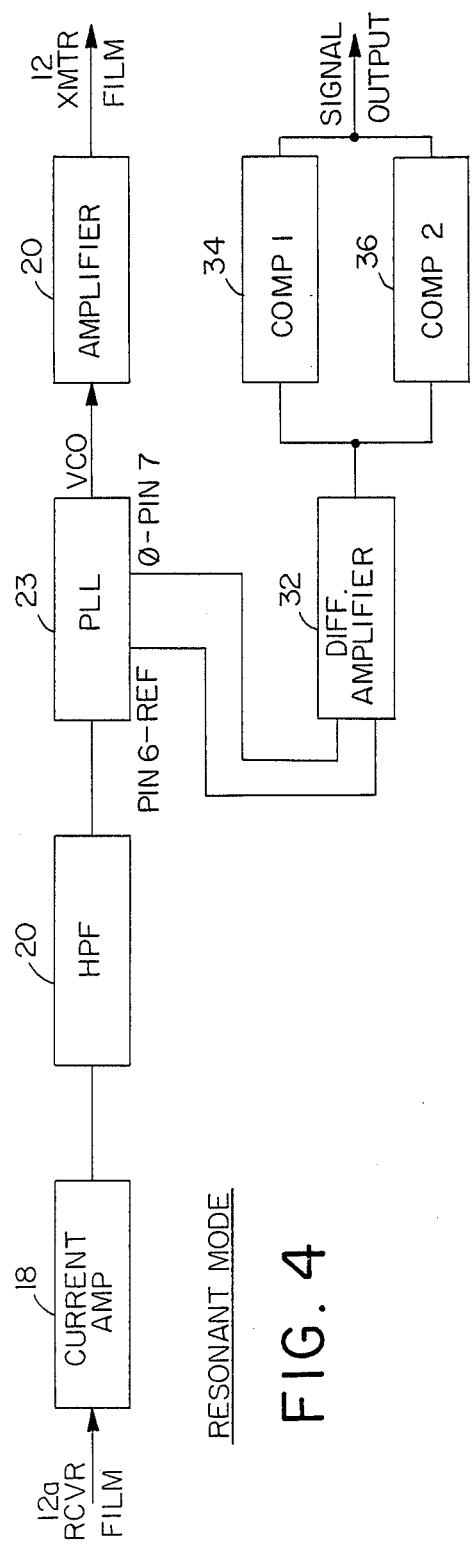
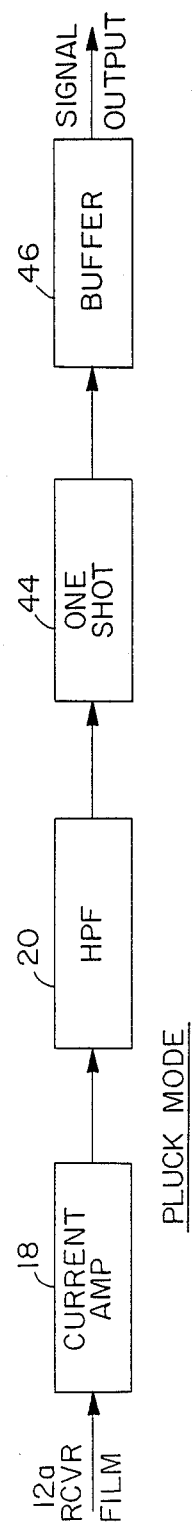
FIG. 4 — RESONANT MODE
FIG. 5 — PLUCK MODE

PIEZOELECTRIC PHASE LOCKED LOOP CIRCUIT

BACKGROUND OF THE INVENTION

A phase-locked loop is an electronic circuit used to lock an oscillator in phase with an arbitrary input signal. Typically, phase-locked loops comprise a phase comparator, a low pass filter and an error amplifier in the forward signal path with a voltage controlled oscillator (VCO) in the feedback path. The function of the VCO is to produce a signal which will act as a reference to the phase comparator, and also track any phase change in the input signal. The frequency of the VCO output is controlled by a dc error signal which is generated by the phase comparator. The dc error signal generated is proportional to the difference in the phase angle between the VCO and the reference input signal.

An important performance parameter of a phase locked loop is its hold-in range. The hold-in range is the maximum change in input frequency for which the loop will remain locked. It is governed by the dc gain of the loop. As the frequency of the input signal is changed, the differential in phase of the two signals inputted to the phase detector will produce a dc voltage which will change the output frequency of the VCO. As the input frequency is further altered, the phase angle differential will continue to increase until it reaches a point where the loop unlocks.

Phase lock loops have numerous applications. While phase locked loops are perhaps most widely utilized in television receivers, they can be adapted to almost any application requiring frequency demodulation. It is well known, for example, that a rigid structure such as a cantilevered beam will vibrate at a characteristic resonant frequency. This frequency is dependent upon the length, width, geometric and structural characteristics of the member with respect to the specific point or node where it is held rigid. In the case of a fixed cantilevered beam, maximum oscillatory deflection will occur at the free end. By damping the free end of a vibrating cantilevered beam, the resonant frequency of vibration will increase and the phase of vibration of the structure will be shifted positive.

A vibrating rigid member can be utilized to produce an input signal for a phase-locked loop circuit. By utilizing one output of the VCO as a driving signal, a rigid member can be made to vibrate at a characteristic frequency. An input signal generated directly from the driven rigid member can then be utilized as an input to a phase comparator in the phase-locked loop. If the vibrating member is deflected or damped, thereby increasing its frequency, the phase of the input signal fed to the phase comparator will change. This phase change will produce a positive output on the phase comparator which will generate a corrective dc error signal to the VCO. The VCO will accordingly attempt to track the change in input phase. If the phase differential ultimately exceeds the hold-in range of the circuit, the loop will unlock.

Piezoelectric films generally have been thought to be unsuited for sensing constant or slowly changing conditions such as the phase changes characteristic of phase-locked loop circuits. New circuit techniques, however, permit piezoelectric films to detect steady-state and slowly changing conditions. These new techniques permit the film to be utilized in association with a vibrating member for use in a phase-locked loop circuit.

Kynar ® piezoelectric film, a commercially available product of Pennwalt Corporation, Philadelphia, PA, assignee of the present invention has excellent electromechanical properties which make it ideal as a transducer material for use in association with a vibrating rigid member. When a voltage of proper polarity is applied to a sheet of piezoelectric film, the film becomes thinner and elongates. If a voltage of opposite polarity is applied, the film accordingly contracts (or shortens) and simultaneously thickens. Accordingly, if directly adhered to a rigid member, the electro-mechanical property of Kynar ® piezo film can be utilized to generate mechanical vibration in the rigid member upon application of an ac signal.

Correspondingly, the mechano-electrical properties of Kynar ® piezo film make it ideal as a transducer for generating an ac input signal for the phase-locked loop. When an external force (such as the mechanical vibration induced in a rigid member) produces compressive and tensile strain in a second film, an electric potential proportional to the change in mechanical stress is produced across the film. When the direction of force is reversed, the polarity of the resulting voltage is reversed. Hence, the vibrations of the beam generated by a first film results in an alternating voltage in a second film which can be used as an input signal in a phase locked loop circuit. Kynar ® piezoelectric film is sensitive enough such that stretching of a mere 5-10 micrometers can yield voltage outputs ranging from 10-1000 volts.

It is an object of the present invention to utilize Kynar ® piezo film in order to generate vibration in a rigid structural member and to utilize that vibration to produce a corresponding input signal for a phase locked loop circuit.

It is another object of the present invention to utilize Kynar ® piezo film in order to generate an input signal for a phase-locked loop circuit which can be used for practical applications such as in an alarm system or a liquid level detector.

SUMMARY OF THE INVENTION

In accordance with the invention, a piezoelectric phase-lock loop circuit is disclosed. The circuit comprises a structural member having a piezoelectric transmitter film and a piezoelectric receiver film adhered thereto, the transmitter film producing electromechanical vibrations in the structural member upon activation by an alternating current input signal, the receiver film producing alternating output signals upon vibration of said rigid member. A voltage controlled oscillator (VCO) means generates the alternating input signal. A phase comparator means compares the phase angle of the signal produced by the receiver film with the phase angle of VCO generated input signal and a low pass filter means connected to the output of the phase comparator means inputs a dc error signal to the voltage controlled oscillator (VCO) means. Which signal drives the frequency of the voltage controlled oscillator (VCO) so as to track the phase of the said input signal whereby a predetermined phase relationship is maintained between the output and input signals.

BRIEF DESCRIPTION OF THE DRAWINGS

FIG. 4 is a block diagram of an alarm system incorporating the phase lock loop of the preferred embodiment.

FIG. 5 is a block diagram of an alternative embodiment of the alarm system incorporating a one shot mode.

DESCRIPTION OF THE PREFERRED EMBODIMENT

Figure 1:
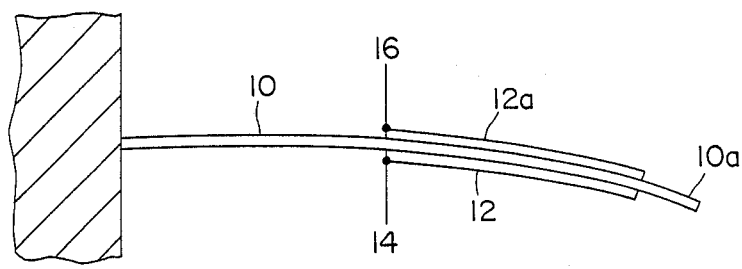
FIG. 1 is a section view of the beam member of the preferred embodiment.

The invention is described with reference to the enclosed Figures wherein the same numbers are used where applicable. Referring to FIG. 1, a rigid beam 10 with one end permanently fixed is shown. Beam 10 is a simple resonant structure. One end is clamped while the other is free to move. When the structure is disturbed with a force impluse at its free end 10a, beam 10 will vibrate at a characteristic resonant frequency. The beam has respective piezoelectric transmitter and receiver films 12, 12a adhered to opposite sides of its surface. As those skilled in the art will readily understand, piezoelectric film 12, 12a must be coated with a metal such as aluminum, chromium, silver or other electrode metal in order to create a usable electric signal. These coatings are generally applied by vacuum deposition.

Beam 10 is excited and caused to vibrate by an output ac signal 14 which, as will be discussed below, is the amplified signal from a voltage controlled oscillator (VCO). The output ac signal 14 when applied to the electrode of piezoelectric transmitter film 12, causes transmitter film 12 to alternatingly elongate and contract. These alternating deformations generate vibrations in beam 10. The vibrations of the beam, in turn, result in alternating mechanical stress in receiver film 12a. The alternating stresses in receiver film 12a, caused by the vibrations of beam 10, generate an ac input signal 16. When the beam is vibrating at a resonant frequency, the output and input signals will operate at the same frequency, with a 0° phase offset. As shown in FIG. 1, the respective transmitter and receiver films 12, 12a are glued to opposing surfaces of the beam. However, the films can be adhered directly to each other, and therefore operate as their own vibrating member.

Figure 2:
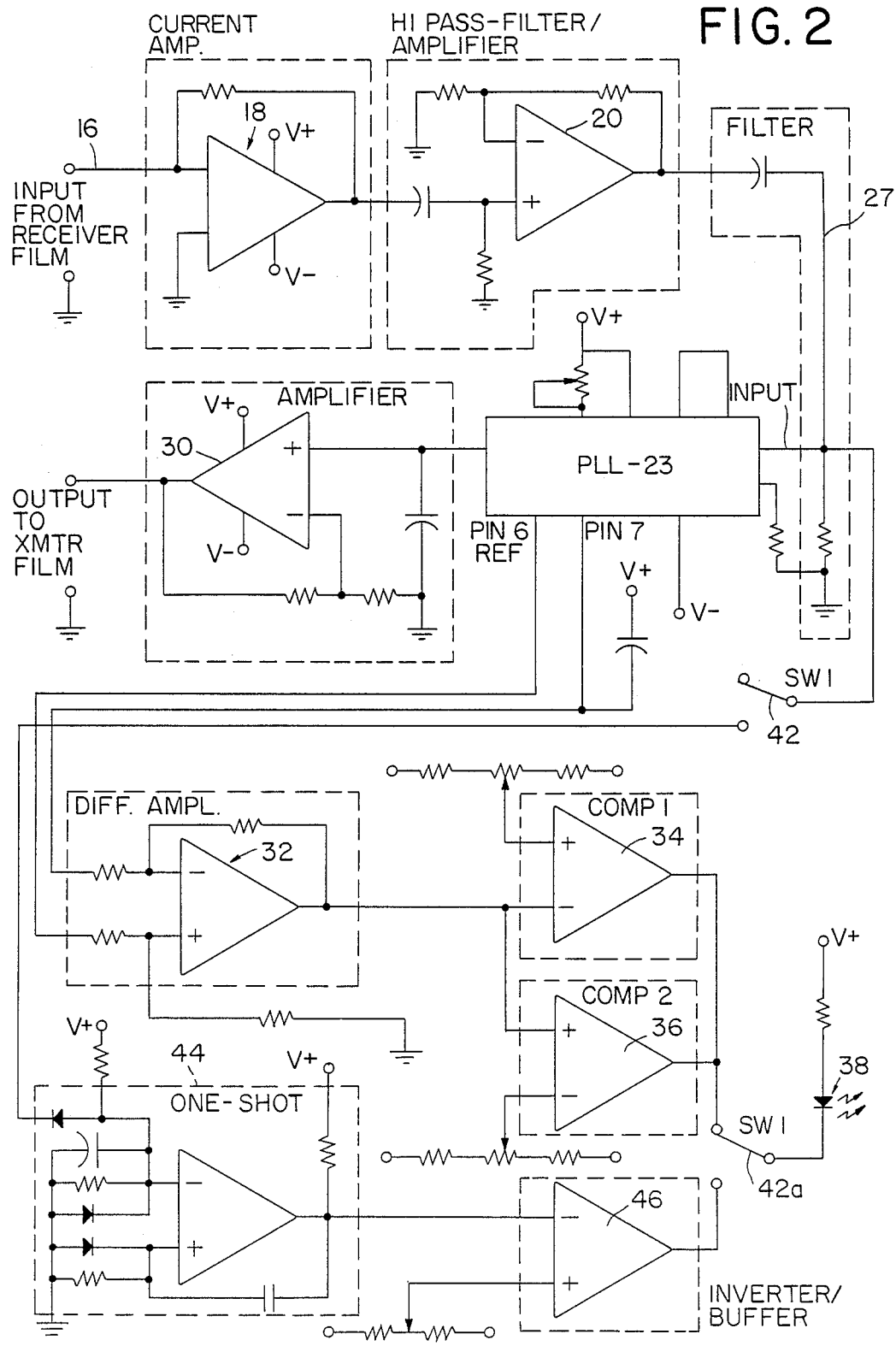
FIG. 2 is a schematic representation of a signal system incorporating the phase-lock loop of the preferred embodiment.

Referring to FIG. 2, the electronic circuitry of the preferred embodiment is disclosed. The ac signal 16 generated by receiver film 12a is fed through current amplifier 18 which minimizes the effects of cabling and lead capacitances. Current amplifier 18 shifts the phase of the input signal by 90 degrees, thereby eliminating the need for a separate phase shifter.

The output of current amplifier 18 is then fed through high-pass filter/amplifer 20 which removes the low frequency noise generated by current amplifier 18. High pass filter/amplifier 20 provides gain but as a pass frequency of approximately two-thirds that of the resonant frequency of beam 10. This frequency provides the best performance for the circuit. A second filter 22 having the same pass frequency as high-pass filter/amplifier 20, provides two pole filtering. This particular component is not vital to the circuit. The degree of filtering can be modified depending upon the resonant frequency of the beam.

Figure 3:
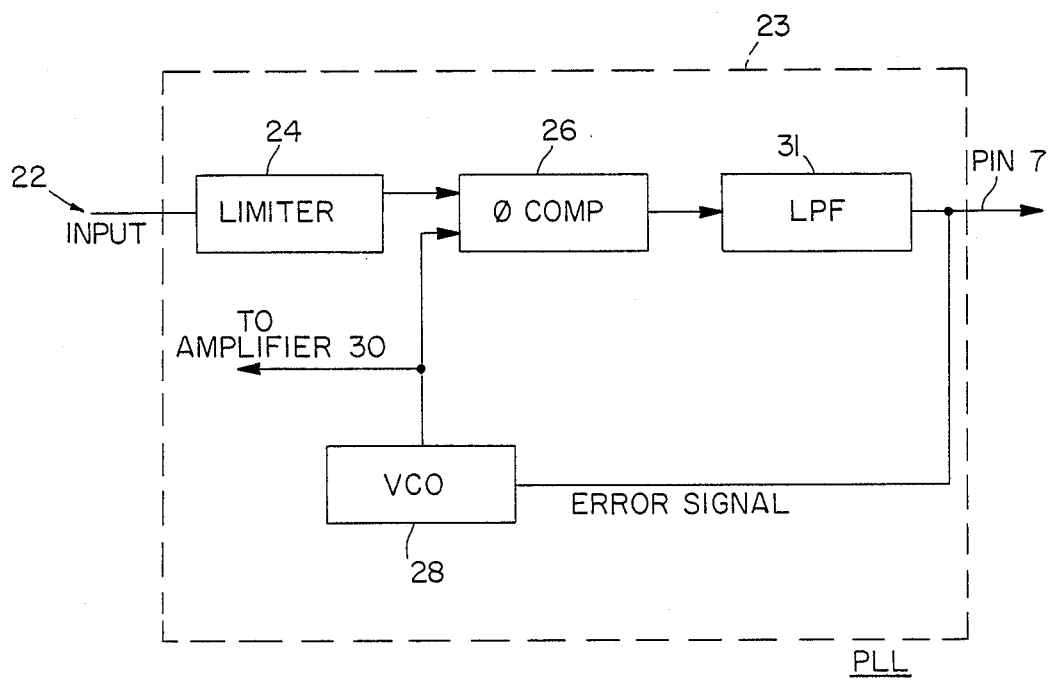
FIG. 3 is a block diagram of the phase-lock loop of the preferred embodiment.

Referring to FIG. 3, the phase lock loop circuit of the preferred embodiment is described. Initially, the output of filter 22 is fed into limiter 24 which holds the signal to a preselected level, e.g. 200 millivolts. The output of limiter 24, which is proportional to the ac signal generated by receiver film 12a, is fed as one input into phase comparator 26. Phase comparator 26 of the preferred embodiment is a conventional component. Two commonly known phase comparators which can be utilized in the present invention are the diode phase comparator and the double-balanced phase comparator. The diode phase comparator has been preferred historically because of its lower cost and better performance at higher frequencies.

The second input of phase comparator 26 is the output of VCO 28, which comprises the feedback loop of the circuit. VCO 28 is also a conventional component. Two common types of VCOs which can be applied in the circuit of the present invention are the reactance modulator and the varactor modulator. Another popular VCO utilizes a multivibrator wherein a timing capacitor charging current is varied by a dc control voltage. The output of the VCO 28 drives transmitter film 12a through amplifier 30, which provides unity gain and a 0° phase shift.

The output of VCO 28 is then compared with the phase shifted ac signal 16 generated by the receiver film 12a. The output of phase detector 26 is fed into low pass filter 31. The frequency of the low-pass filter 31 determines the frequency response of the phase-lock loop. Low-pass filter 31 filters out the high frequency component of the phase-comparator output and passes the dc response to VCO 28. In phase-lock, low-pass filter 31 passes a dc voltage corresponding to the phase differential between the output of VCO 28 and output signal 16 generated by the receiver film 12a.

A phase differential of approximately —0— (zero) corresponds to a condition of undamped resonance in the beam member. If the resonant frequency of vibration of beam 10 increases due to damping, the phase of input signal 16 fed through the phase comparator 26 will shift positively. If the frequency of vibration of the beam drops due to undamping, the phase of input signal 16 shifts in a negative direction. In either situation, a dc error signal corresponding to the phase shift will be passed as a dc voltage to VCO 28 through a low pass filter 31. VCO 28 will attempt to track the change in phase of the input signal.

Ideally, the phase-lock loop should be designed to have an operating range between pre-set high and low limits. It is optimal to have a narrow hold-in range on the phase-lock loop, yet one which is broad enough so as to keep the loop locked through minor disturbances. Accordingly, as long as beam 10 is not significantly damped (or undamped), the circuit should remain within its hold-in range. When, for example, beam 10 is signficantly damped, the circuit will be forced out of its hold-in range. Significant damping will force phase comparator 26 and low pass filter 31 into saturation.

The operation of beam 10 in conjunction with the phase-lock loop circuit is now described with reference to FIGS. 1 and 2. When the system is first powered up, beam 10 is assumed not to be vibrating. Therefore, input signal 16 will approximate a zero output. Phase comparator 26 will produce a voltage corresponding to the free running frequency of VCO 28. Phase comparator 26 will output a dc component which will maintain VCO 28 at its free running frequency. The signal from the VCO 28 will then drive the beam through transmitter film 12, thereby initiating vibration in the structure. This vibration will generate an output signal 16 on the receiver film 12a, which will, after amplification and filtering, input to phase detector 26. As input signal 16 increases in amplitude, the system will begin to phase lock, except for a finite phase difference. This phase difference generates a corrective error voltage which shifts the VCO frequency from its free running value.

When the resonant frequency of the beam 10 is not the same as the free running frequency of VCO 28, the return signal will be phase shifted in such a way as to generate a dc signal on phase detector 26. This dc component will force the frequency of VCO 28 in the direction of the new resonant frequency. The output frequency of VCO 28 will change until the phase difference between VCO 28 and the input signal 16 is minimized. When locked on the resonant frequency of the beam, the output of phase detector 26 will approach 0 (zero).

The resonant beam and phase lock loop circuitry can be combined with circuitry which will indicate when the phase locked loop is unlocked. This circuitry facilitates the practical application of the circuit. Referring to FIGS. 2, 3 and 4, pin 6 of the phase-lock loop is a dc reference voltage (both positive and negative) which tracks the output of low-pass filter 31 to a predetermined maximum hold-in level for the system. The reference signal can be produced by a limiter which tracks the output of VCO 28 until it reaches a preselected value corresponding to a preselected hold-in level. Pin 7 is the dc voltage produced by low-pass filter 31. The preselected hold-in level must be slightly below that of the maximum voltage level of pin 7. This maximum level will in practical terms correspond to saturation of the phase comparator 26 and low-pass filter 31. Pins 6 and 7 input to a differential amplifier 32. The output voltage of the differential amplifier 32 then indicates whether the circuit is in phase-lock. This output differential amplifier 32 will approach 0 (zero) volts when the phase-lock loop remains locked, i.e. when the output of pin 6 equals the output of pin 7. When the loop unlocks the value of pin 7 will exceed that of pin 6 (either positive or negative) and differential amplifier 32 will output a non-zero value. The output of differential amplifier 32 is then fed through a pair of comparators 34, 36 in a "wired-or" configuration.

The use of the "wired-or" configuration permits the circuit to activate on either a positive or negative output on differential amplifier 32. Thus, for example, if the loop is pulled out of range high, comparator 34, for example, goes low. Indicating means such as LED 38 will light thereby indicating that the circuit is out of lock. If the circuit unlocks low, then comparator 36, goes low, again causing LED 38 to light. In either event, if the system is pulled out of phase lock, the "wired-or" comparator configuration will output a value which will cause LED 38 to light.

The present invention suggests numerous practical applications of which the following are examples. First, the circuit can be utilized in an alarm system. In such a system, an undamped vibrating beam member such as beam member 10 could be attached in proximity to a window or door. The opening of the window or door by an intruder could activate means which significantly dampen beam 10, thereby increasing the resonant frequency of beam so as to shift the phase of input signal 16. The change in input phase when compared with the phase of the VCO 28 will generate an error signal which will be fed back to the VCO. The error signal increases the frequency of VCO so as to track the input signal. The dc output of the phase detector will feed to a differential amplifier where it is compared with a second tracking reference signal. As a predetermined point is reached, the second tracking signal will be limited thereby producing a positive output on the differential amplifier. The output of the differential amplifier can be used to generate an output signal. As noted previously, the phase shift can be either positive or negative. Thus, the loop can be set to stay phase-locked until opening of the window or door can undampen the resonant structure and thereby unlock the loop.

Figure 1A:
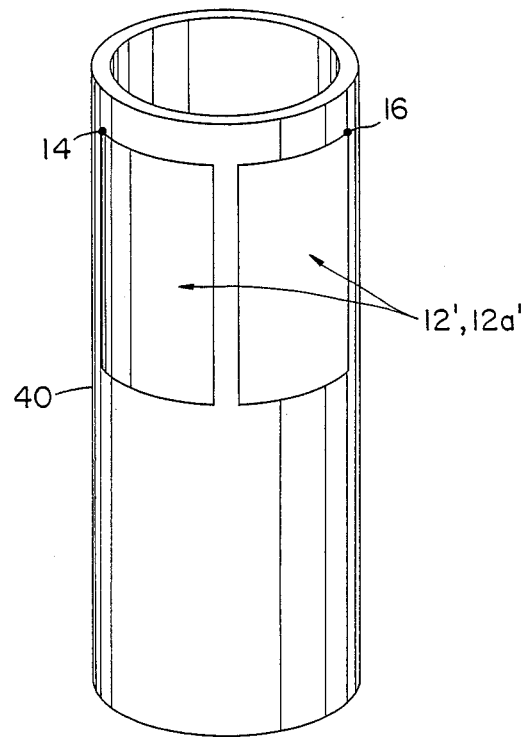
FIG. 1A is a perspective view of a fluid-level detector utilizing the piezoelectric phase-locked loop.

Those skilled in the art will readily recognize that the principles of applicant's piezoelectric phase-lock loop can be applied to any vibrating structure or member. Thus, referring to FIG. 1A, the circuit can be applied, for example, to a liquid detector. In this application the transmitter film 12' is used to generate vibration in a beaker or vessel 40. The vibrations generate an output signal in receiver film 12a'. The addition of liquid will dampen or change the resonant frequency of the beaker 40. Incorporating the circuitry of phase-locked loop and signaling circuitry of FIGS. 2 and 3, the piezoelectric phase-locked loop circuit can be designed with a hold-in range such that the circuit stays locked until a liquid reaches a pre-set level in the beaker. Upon reaching the pre-set level, the circuit would unlock, thereby activating indicating or activation circuitry. As those skilled in the art will readily discern, the circuit can be applied to any application where a change in pressure in a member alters its resonant frequency.

In an alternative embodiment, the invention operates in a one-shot mode. In this embodiment switches SW1, 42, 42a are depressed downward thereby bypassing the phase-locked loop and differential amplifier circuitry. Upon activation of the beam member 10 an electronic output signal is generated. The signal passes through current amplifier 18, high pass filter/amplifier 20 and second filter 22. The signal inputs into a one-shot 44. The one-shot 44 indicates whether the switch has been "twanged". The output of the one-shot then can be fed into an inverter buffer which produces an output signal on LED 38.

While the applicant has disclosed two embodiments of the invention, it will be readily understood by those skilled in the art that other embodiments than those disclosed fall within the spirit and scope of the claims attached hereto.

I claim:
1. A piezoelectric phase-lock loop circuit comprising:
 (a) a structural member having a piezoelectric transmitter film and a piezoelectric receiver film adhered thereto, said transmitter film producing electro-mechanical vibrations in said structural member upon activation by an alternating current input signal, said receiver film producing alternating output signals in response to vibration of said structural member;
 (b) voltage controlled oscillator means for generating said alternating input signal;
 (c) phase comparator means for comparing the phase angle of the signal produced by said receiver film with the phase angle of said alternating input signal and for outputting a signal corresponding to the differential in phase angle;

(d) low pass filter means connected to the output of said phase comparator means for inputting a dc error signal corresponding to said phase differential to said voltage controlled oscillator means, said dc error signal forcing the frequency of said voltage controlled oscillator means to track said output signal whereby a predetermined phase relationship is maintained between said output and input signals.

2. The piezoelectric phase-lock loop circuit recited in claim 1 further comprising a current amplifying means for shifting the phase of the output signal generated by said receiver film by approximately 90°.

3. The piezoelectric phase-lock loop circuit of claim 2 further comprising amplifier means for amplifying the signal from said voltage controlled oscillator means which drives said transmitter film.

4. The piezoelectric phase lock loop circuit of claim 1 further comprising:

(a) means for producing a reference signal corresponding to said error signal;

(b) means for producing a tracking signal corresponding to the dc component of said error signal, said tracking signal tracking said reference signal to a point corresponding to said predetermined phase relationship;

(c) differential amplifier means for determining a difference between said reference signal and said tracking signal;

(d) comparator means for registering a signal output when said reference signal exceeds said tracking signal; and (e) signaling means for indicating when said reference signal is not equal to said tracking signal.

5. The piezoelectric phase-lock loop circuit of claims 1 or 4 where said structural member is a cantilevered beam.

6. The piezoelectric phase-lock loop circuit of claims 1 or 4 wherein said structural member is a beaker and said predetermined phase relationship is maintained until said beaker fills with a liquid to a pre-set level.

7. An apparatus for detecting a change in the vibrational characteristics of a structural member, comprising:

(a) a structural member having a piezoelectric transmitter film and a piezoelectric receiver film adhered thereto, said transmitter film producing electro-mechanical vibrations on said structural member upon activation by an alternating current input signal, said receiver film producing an alternating current output signal upon vibration of said structural member;

(b) voltage controlled oscillator means for generating said alternating input signal;

(c) phase comparator means for comparing the phase angle differential between said alternating input signal and said alternating current output signal, said phase comparator means generating a signal proportional to said phase angle differential;

(d) low pass filter means for passing an error signal proportional to the signal generated by said phase comparator, said signal proportionally adjusting the frequency of said voltage controlled oscillator to a frequency within a preselected frequency range;

(e) means for producing a first signal corresponding to said error signal;

(f) means for producing a second signal corresponding to the dc component of said error signal, said second signal tracking said first signal to a point corresponding to a predetermined phase relationship;

(g) differential amplifier means for determining a difference between said first signal and said second signal; and (h) light emitting diode means for indicating when said first signal exceeds said second signal.

8. Apparatus for sensing a change in pressure on a structural member comprising:

(a) a structural member having a piezoelectric transmitter film and a piezoelectric receiver film adhered thereto, said transmitter film producing electro-mechanical vibrations in said structural member upon activation by an alternating current input signal, said receiver film producing alternating output signals in response to the vibration of said structural member, said frequency of vibration increasing when said structural member is deflected;

(b) voltage controlled oscillator means for generating said alternating input signal;

(c) phase comparator means for comparing the phase angle of the signal produced by said receiver film with the phase of said alternating input signal;

(d) low pass filter means connected to the output of said phase comparator means for inputting a dc error signal to said voltage controlled oscillator means, said dc error signal forcing the frequency of said voltage controlled oscillator means toward said output signal so as to maintain a predetermined phase relationship between said output and input signals;

(e) means for producing a first signal corresponding to said error signal;

(f) means for producing a second signal corresponding to the dc component of said first signal, said second signal tracking said first signal to a point corresponding to said predetermined phase relationship;

(g) differential amplifer means for determining a difference between said first signal and said second signal;

(h) said differential amplifier means registering an output when said member is deflected;

(i) comparator means for registering a signal when said first signal exceeds said second signal; and (j) means for indicating when said first signal exceeds said second signal upon the deflection of said member.

* * * * *